W. Hanlon,
Cricket Wicket.
N° 32,869. Patented July 23, 1861.
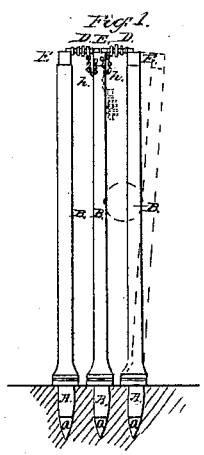
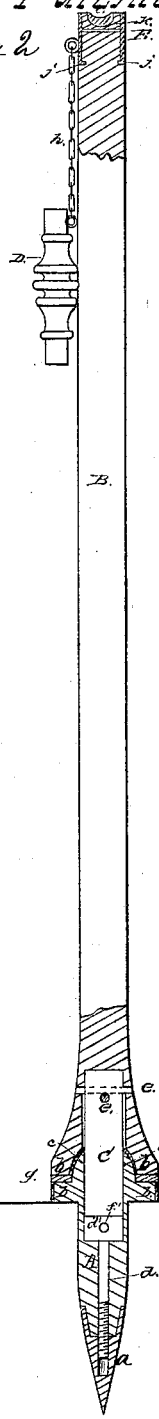
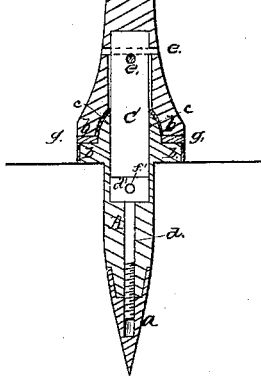
Witnesses.
Inventor:
W. Hanlon
per Munn & Co
Attorneys

UNITED STATES PATENT OFFICE.

WM. HANLON, OF PHILADELPHIA, PENNSYLVANIA.

CRICKET-WICKET.

Specification of Letters Patent No. 32,869, dated July 23, 1861.

*To all whom it may concern:*

Be it known that I, WILLIAM HANLON, of the city and county of Philadelphia and State of Pennsylvania, have invented certain new and useful Improvements in Wickets for the Game of Cricket; and I do hereby declare that the following is a full, clear, and exact description of the same, reference being had to the accompanying drawings, forming part of this specification, in which—

Figure 1, is a front view of a complete wicket with my improvements. Fig. 2, is a longitudinal view of one of the stumps showing it partly in section. Fig. 3, is a top view of the three stumps of the wicket arranged in line.

Similar letters of reference indicate corresponding parts in the several figures.

The principal object of my invention is to obviate the necessity of picking up the stumps and bails from the ground and replacing the stumps every time a player is "put out" as is necessary with the wickets heretofore used; and to this end my invention consists firstly in the construction of the stumps with spring joints near the bottom which will permit them to yield and fall over sufficiently to displace the bails when struck by the ball without disturbing their security in the ground and to enable them to resume of themselves the upright position after the ball has passed them; secondly, in attaching the bails to one or more of the stumps by chains or cords to prevent them from falling far from the top of the wickets.

It further consists in providing the upper ends of the stumps with adjustable bail supporters containing the grooves for the reception of the bails, to enable the several grooves to be brought in line with each other in position to receive the bails, without moving the stumps in the ground after they have been driven thereinto in upright positions.

To enable others to make and use my invention, I will proceed to describe its construction and operation.

The stumps are each composed of two principal parts A, and B, both made of some tough wood but the lower portion A, which is driven into the ground being shod with a pointed shoe $a$, of iron or other hard metal. The said portion A, has formed upon it a flange or collar $b$, to rest upon the surface of the ground and is finished above the said flange with a rounded central boss $c'$, (see Fig. 2.) and it is bored out centrally from the top for the reception of the lower part of the spring C, which attaches the upper portion B, and further bored for the reception of a screwed rod or pin $d$, which screws into a tapped hole in the shoe $a$, for the attachment of the spring. The upper portion B, which is of the form of that part of the ordinary stump which stands above the ground has around its bottom a flange $b'$, corresponding in size with the flange $b$, of the lower portion A, and is bored out from the bottom for the reception of the upper part of the spring C, and counterbored for the reception of the boss $c$. An india-rubber ring $g$, is placed between the flanges $b$, $b'$.

The spring C, is made of a piece of stout india-rubber cord or tubing. It is secured to the upper portion B, of the stump by the insertion of pins $e$, $e$, transversely through it and the said portion B, and it is secured to the lower portion A of the stump by being fitted into a cup like head $d'$, provided on the rod or pin $d$, and by having a pin $f$, inserted through it and the said cup. Instead of the india-rubber spring a spiral spring of metal may be used. The spring joint thus constructed at the base of the stumps provides for their bending in the manner indicated in red outline in Fig. 1, in any direction required when the ball strikes them and the consequent liberation and fall of the bail or bails D, D, and after the ball has passed them the spring causes the upper parts A, at once to resume their upright positions.

The ball is represented in red color in Fig. 1, in the act of striking. The india-rubber ring $g$, prevents the flange $b'$, slamming upon the flange $b$, and producing violent concussion by which the flanges would be likely to split. The screw thread on the rod or pin $d$, enables the tension of the spring to be regulated by turning the portion B, while A, is stationary, or vice versa.

The bails D, D, are of ordinary form and both may be attached to the center stump as represented in Fig. 1, or one to each of any two of the stumps. The attachment is represented as made by means of small chains $h$, $h$, but cords may be substituted for the chains, said cords or chains connected with the stumps near the tops thereof and being only of sufficient length to let the bails fall easily.

The adjustable bail supporters consist simply of metal caps E, E, fitted to the heads of the stumps to turn freely thereon, such caps having grooves $i, i$, in their heads, like what are commonly provided in the heads of the stumps. The said caps have their upper parts filled with short plugs of wood as shown at $k, k$, the said plugs being secured by screws $l, l$, and they are secured to the heads of the stumps by having their lower edges turned inward as shown at $j, j$, in Fig. 2, to enter small grooves cut around the stumps for their reception. By turning these caps, the grooves $i, i$, may be all brought in line with each other as represented in Fig. 3, in whatever position they may have been on the insertion of the stumps into the ground.

What I claim as my invention and desire to secure by Letters Patent; is—

1. The construction of wicket stumps with spring joints substantially as and for the purpose herein set forth.

2. The attachment of the bails to one or more of the stumps by chains or cords substantially as and for the purpose herein specified.

3. The adjustable bail supporters, fitted to the heads of the stumps substantially as and for the purpose herein described.

WILLIAM HANLON.

Witnesses:
 JOHN THOMPSON,
 SAMUEL MURSET.